United States Patent [19]

Colas et al.

[11] Patent Number: 5,225,452
[45] Date of Patent: Jul. 6, 1993

[54] SILICONE FOAM FORMING COMPOSITION

[75] Inventors: André R. L. Colas, Glashuetten; Heinz Mueller, Mainz, both of Fed. Rep. of Germany

[73] Assignee: Dow Corning GmbH, Rheingaustrasse, Fed. Rep. of Germany

[21] Appl. No.: 987,832

[22] Filed: Dec. 9, 1992

[30] Foreign Application Priority Data

Dec. 21, 1991 [GB] United Kingdom ................ 9127179

[51] Int. Cl.$^5$ ............................................. G08J 9/02
[52] U.S. Cl. ........................................ 521/124; 521/92; 521/93; 521/123; 521/154; 528/15; 528/17
[58] Field of Search .................. 521/92, 93, 123, 124, 521/154; 528/15, 17

[56] References Cited

U.S. PATENT DOCUMENTS 4,433,069  2/1984  Harper .................................. 521/99

FOREIGN PATENT DOCUMENTS 179598  4/1986  European Pat. Off. .
338693  10/1989  European Pat. Off. .

*Primary Examiner*—Morton Foelak
*Attorney, Agent, or Firm*—Robert Spector

[57] ABSTRACT

A foam forming composition comprises (a) one or more polysiloxanes having not less than three alkylhydrogen siloxane units per molecule, (b) one or more polysiloxanes having not less than two silicon-bonded hydroxyl group per molecule, (c) at least one liquid organic titanium compound and (d) a catalyst. Reaction between the organic titanate (e.g. tetraisopropyltitanate) and the hydroxy functional polysiloxane rapidly increases viscosity of the mixture to restrict flow of the composition as it cures to form a foam within 240 seconds of mixing. A vinyl polysiloxane may be incorporated.

13 Claims, No Drawings

SILICONE FOAM FORMING COMPOSITION

It has been proposed to form foamed silicone masses by use of a foam forming silicone composition. Numerous formulations for such compositions have been proposed which foam and cure over a period of time. For various purposes it is desirable to employ a multi component composition which foams and cures at or near room temperature. It is generally preferred that each of the component parts of such a composition is of a comparatively low viscosity for ease of mixing and application. Due to the nature of these formulations an interval of time must elapse after mixing the component parts before the mixed composition develops sufficient body that the composition does not flow readily. For some applications this time interval has been found to be sufficiently great that mechanical barriers are desirable to hold the composition in place whilst it foams and cures. It has also been proposed to provide a foamable composition which cures comparatively quickly; see for example E.P. 338 693. However, even those foamable compositions which foam and cure within seconds of mixing require at least a small period of time to develop an at least substantially non-flowable condition.

It is an object of the present invention to provide an improved foam forming silicone composition.

We have now found that a foam forming silicone composition may be prepared by use of selected materials including a hydroxypolysiloxane, a hydropolysiloxane and an organic titanium compound.

The present invention provides in one of its aspects a foam forming composition comprising (a) one or more polysiloxanes having not less than three alkylhydrogen siloxane units per molecule, (b) one or more polysiloxanes having not less than two silicon-bonded hydroxyl groups per molecule, (c) at least one liquid organic titanium compound and (d) a catalyst.

Suitable polysiloxanes (a) having alkylhydrogensiloxane units include polymers having units according to the general formula

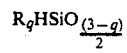

in which each R represents a monovalent hydrocarbon group having 1 to 20 carbon atoms e.g. a lower alkyl or phenyl group e.g. a methyl group, and q is 1 or 2. The alkylhydrogen polysiloxanes may also comprise units

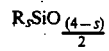

in which R is as referred to above and s is 1, 2 or 3. Reactions of the preferred compositions to generate hydrogen gas and to cure the mass through chain extension and crosslinking within the desired time span are dependant on presence of appropriate proportions of the interactive substituents and the alkylhydrogen polysiloxane is selected accordingly. Preferably this polysiloxane has from 0.88% to 1.70% by weight of silicon-bonded hydrogen atoms. It is preferred that each R represents a methyl group (Me). Preferably terminal groups of the alkylhydrogen polysiloxane have the formula $R_3SiO_{\frac{1}{2}}$ where each R represents a methyl group. Suitable alkylhydrogen polysiloxanes include those comprising MeHSiO units with or without the presence of Me$_2$SiO units and having viscosities of the order of from about 1 to about 300 mm$^2$/s more preferably from about 10 to about 100 mm$^2$/s at 25° C.

Suitable polysiloxanes (b) having silicon-bonded hydroxyl groups are polymers which include one or more units according to the general formula

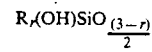

in which each R is as aforesaid and r is 1 or 2. These polysiloxanes also comprise units

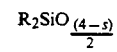

in which R and s are as referred to above. These materials are preferably liquids and are chosen so that their functionality and chain length are appropriate to the viscosity required of the component parts of the mixed composition, the amount of hydrogen evolution and the degree of chain extension and cross-linking required during curing of the composition. The polysiloxanes having silicon-bonded hydroxyl groups are preferably silanol terminated polydiorganosiloxanes according to the general formula HO(R$_2$SiO)$_t$H in which each R represents a methyl group. In order to ensure a satisfactory viscosity of each Part of a multicomponent composition, at least a significant proportion of these silanol materials have a value of t up to about 25 such that the polysiloxane has a viscosity of about 10 to about 120 mm$^2$/s. However, in order to achieve the full flow reducing effect of this invention, a proportion of these silanol materials have a value t such that the polysiloxane has a viscosity of about 100 to 75000 mm$^2$/s, more preferably 2000 to 75000 mm$^2$/s at 25° C.

Compositions according to the invention may, and preferably do, also include one or more compounds having carbon-bonded hydroxyl groups. This component influences the structure of foams formed and has a significant influence on lowering the density of the cured foam. Suitable materials include the lower aliphatic monofunctional alcohols having up to 8 carbon atoms, e.g. methanol, n-propyl alcohol, iso-propyl alcohol and benzyl alcohol. This material is preferably present to an extent of up to 4% by weight of the composition as a whole.

A composition according to the invention comprises one or more liquid organic titanium compounds (c), for example tetra-n-propyl- titanate, tetraisopropyltitanate, tetrabutyltitanate, tetrakisethylhexyltitanate or ethylacetoacetate-titan-chelate, in the foamable mixture. These titanium compounds may be present in a proportion such that the ratio of silanol groups, to moles of titanium

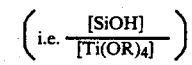

is in the range of about 1.5 to 7.5, preferably in the range 1.8 to 4.9.

A composition according to the invention may also comprise one or more polysiloxanes (e) having unsaturated hydrocarbon groups available for reaction with the polysiloxane (a). This polysiloxane (e) may have two or more siloxane units carrying silicon-bound unsaturated hydrocarbon groups, R', for example cyclohexenyl or R"CH=CHR'", where R" may be absent or denote a divalent hydrocarbon group, and R'", denotes a hydrogen atom or an alkyl group; for example, the unsaturated hydrocarbon group R' may be a vinyl, allyl or hexenyl group. These polysiloxanes also comprise units

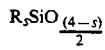

where R and s are as defined above. As in the case of polysiloxanes (a) and (b) the R groups of the various siloxane units of polysiloxane (e) denote monovalent hydrocarbon groups containing 1 to 20 carbon atoms, and these are preferably methyl groups. These substances (e) react with the silicon-bound hydrogen atoms in a hydrosilylation reaction in the presence of a hydrosilylation catalyst to contribute to the polysiloxane matrix. Preferably, these polysiloxanes comprise 0.001% to 1% by weight of aliphatically unsaturated groups and have a viscosity of the order of about 10 mm$^2$/s to about 25,000 mm$^2$/s. More preferably, their viscosity is within the range from 100 mm$^2$/s to 5,000 mm$^2$/s. If desired, mixtures of polysiloxanes (e) can be used which have different contents of unsaturated groups or different viscosities.

A composition according to the invention preferably also comprises a polyorganosiloxane (f) comprising

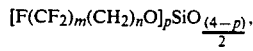

$R_3SiO_{\frac{1}{2}}$, $SiO_{4/2}$ units and silicon-bonded hydroxyl groups wherein each R represents a monovalent hydrocarbon group containing from 1 to 20 carbon atoms, m is an integer having an average value of from 1 to 20, n has the value 1 or 2 and p has the value 1, 2 or 3. This polyorganosiloxane may also include from 0 to 10 percent, based on the weight of said polyorganosiloxane, of $GSiO_{3/2}$ units wherein G represents the residue obtained by removing the hydrogen atom from a hydroxyl group of a linear organic polymer selected from the group consisting of homopolymers of ethylenically unsaturated alcohols copolymers of these alcohols with ethylenically unsaturated hydrocarbons, polyethers and polyoxyalkylene glycols wherein said organic polymer contains an average of at least one terminal hydroxyl group per molecule. These materials are more fully described in European Patent Specification 179 598. In preferred materials (f), the molar ratio of $R_3SiO_{\frac{1}{2}}$ units to the total number of

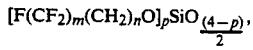

$SiO_{4/2}$ units and $GSiO_{3/2}$ units is from 0.3 to 1.3. Preferably m represents an even integer and the average value of m is 8, n is 2 and p is 1. Suitable polyorganosiloxanes include those in which the concentration of

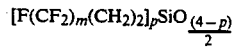

units is sufficient to impart a surface tension of less than $2.2 \times 10^{-4}$ newtons per centimeter at 25° C. to a 10% by weight solution of said polyorganosiloxane in a hydroxyl endblocked polydimethylsiloxane exhibiting a viscosity of 0.08 mm$^2$/s at 25° C. Preferred materials (f) are the products of treatment of hexamethyldisiloxane coated polysilicates treated with the alcohol $F(CF_2)_8$—$CH_2CH_2OH$ to react with some at least of the silicon-bonded hydroxyl groups of the polysilicate. The preferred materials (f) are polydiorganosiloxanes having minor amounts (e.g. up to 3%, preferably less than 1% by weight) of silicon-bonded hydroxyl groups which contribute to the total silicon-bonded hydroxyl groups of the composition.

A composition according to the invention comprises a catalyst (d) for the reaction between SiH and silanol groups. The catalyst may comprise any of the materials known to catalyse this reaction, e.g. organic tin compounds and platinum compounds or complexes. When a polysiloxane (e) is present the catalyst is preferably a noble metal catalyst, for example a rhodium catalyst, and is preferably a platinum catalyst. Platinum catalysts may take any of the known forms, ranging from platinum as deposited on carriers such as silica gel or powdered charcoal, to platinic chloride, salts of platinum and chloroplatinic acids. Preferred forms of platinum include chloroplatinic acid either as the commonly obtainable hexahydrate or the anhydrous form (on account of its easy dispersibility in organosilicon systems and its non-effect on colour of the mixture) and complexes formed therewith e.g. those prepared from chloroplatinic acid hexahydrate and divinyl tetramethyldisiloxane. If desired, platinum catalyst inhibitors e.g. alkynols (e.g. methyl butynol) may be included, although their rate controlling characteristics should be such that rapid setting of the deposited mixing composition is not undesirably extended.

If desired, minor amounts of other materials may be included in a composition according to the invention, for example fillers, colorants, extenders and crosslinking agents.

The proportions of the components (a), (b), (c), (d), (e) and (f) are chosen so that the ratio of silicon-bonded hydrogen atoms of polysiloxane (a) to carbon-bonded and silicon-bonded hydroxyl groups provided by the other ingredients is in the range 1:1 to 20:1, more preferably in the range 2:1 to 9:1. The ratio of the aliphatically unsaturated groups to the silicon-bound hydrogen atoms is preferably within the range from 0:1 to 0.5:1, and better still within the range from 0.01:1 to 0.05:1. The ratio of the silicon-bonded hydrogen atoms to the silicon-bonded hydroxyl groups is preferably within the range from 2:1 to 25:1, more preferably 2:1 to 6:1.

Compositions according to the invention foam and cure readily when mixed at room temperature (of the order of 15° to 30° C.) by hand using a spatula or static mixer or by use of machinery e.g. a jet impingement mixer and do not require a heating step to effect cure.

These compositions are curable to form a polysiloxane matrix which is foamed by evolution of hydrogen gas in presence of the catalyst according to the scheme ≡SiH+HOQ→≡SiOQ+H$_2$. The cure may be accelerated by heating. The cure proceeds in such a way that the composition forms a foam within 240 seconds of mixing at 20° C. which is elastomeric and has good "green strength". The curing reaction proceeds over several hours to provide a dry fully cured cellular foam having a density of 500 kg/m$^3$ or less which may comprise a predominantly open cell structure.

In a composition according to the invention, the liquid organic titanium compound and the polysiloxane (b) interact rapidly to develop increased viscosity. Accordingly it is necessary to store the composition as two or more component Parts in which the liquid organic titanium compound and the polysiloxane (b) are kept separate from each other until the composition is required for use. It is also necessary to store the catalyst separate from a mixture of polysiloxanes (a) and (b) and we prefer to store the polysiloxane (a) separate from the catalyst. Thus, the composition may be stored in three component Parts, with the liquid organic titanium compound admixed with an inert fluid (to yield a suitable viscosity) providing one of the parts. When a polysiloxane (e) is present, and particularly if the parts are intended to be mixed and cured within a comparatively short time period, the liquid organic titanium compound may be stored with it; in such a case, a two component composition may be formulated containing the polysiloxanes (a) and (b) as one component Part and other ingredients in the other Part. Thus, the composition may be provided as two or more storage stable component Parts. Preferably the component Parts have similar viscosities one to the other. We prefer to employ a two Part composition of which each Part has the same viscosity, which is preferably less than 15000 mm²/s. Preferred compositions comprise polysiloxanes (a), (b), (e) and (f) liquid organic titanium compound and platinum catalyst all as aforesaid.

Compositions according to the invention when mixed form into a foam quickly and, prior to becoming self supporting, also quickly develop a resistance to flow which remains at least for a time sufficient to enable curing of the mixture in the form of a foam. The viscosity of the mixed composition has been found to be several times greater than the viscosity of a similar mixture containing no liquid organic titanium compound. Thus, the mixture will remain in place long enough to cure without the requirement of exterior support.

In order that the invention may become more clear there now follows a description of example compositions according to the invention. All parts are by weight unless otherwise specified.

EXAMPLE I

Hydroxy System

A first comparative composition comprised two Parts A and B for admixture in a ratio of 1:1. The part A comprised two alpha, omega dihydroxy polydimethylsiloxanes namely 28 parts of a first alpha, omega dihydroxy polysiloxane having a viscosity of about 42 mm²/s at 25° C. and 62 parts of a second alpha, omega dihydroxy polydimethylsiloxane having a viscosity of about 2000 mm²/s at 25° C., 3 parts isopropyl alcohol, 0.7 part of a catalyst comprising chloroplatinic acid complexed with vinyl disiloxane and 6 parts of a polysiloxane (f) surfactant prepared from 123 parts of a 70% solution in xylene of a resinous siloxane copolymer, 10.0 parts of an alcohol having the average formula $F(CF_2)_8CH_2CH_2OH$, 66 parts of xylene, 0.5 part of a solution of potassium hydroxide in ethanol and two parts of an acid clay. The siloxane copolymer consisted essentially of units of the formulae $(CH_3)_3SiO_{\frac{1}{2}}$ and $SiO_{4/2}$ in a molar ratio of about 0.75:1.0 respectively and contained about 0.5% by weight of silicon-bonded hydroxyl groups. The contents of the reactor were heated at the boiling point for one hour, then cooled to 50° C. and neutralized by bubbling carbon dioxide through the reaction mixture. The resultant mixture was then combined with 100 parts of a trimethylsiloxy end-blocked polydimethylsiloxane exhibiting a viscosity of 10 mm²/s and a surface tension of $2.03 \times 10^{-4}$ newtons/cm, and the volatile materials were then evaporated under reduced pressure. The resultant clear solution exhibited a surface tension of $1.92 \times 10^{-4}$ newtons/cm and contained a polyorganosiloxane with units of the average formula $F(CF_2)_8CH_2CH_2OSiO_{3/2}$, $(CH_3)_3SiO_{\frac{1}{2}}$ and $SiO_{4/2}$ having about 2.48% silicon-bonded hydroxyl groups. The Part A had a viscosity of 800 mm²/s. The part B comprised 26 parts of the first alpha, omega hydroxy polydimethylsiloxane, 24 parts of the second alpha, omega polydimethylsiloxane, 24 parts of a third alpha, omega hydroxy polydimethylsiloxane having a viscosity of about 13,500 mm²/s and 26 parts of a trimethylsiloxy endblocked methyl hydrogen polysiloxane having a viscosity of about 30 mm²/s at 25° C. The Part B had a viscosity of 830 mm²/s.

When the composition was formed by mixing the Parts A and B in a ratio of 1:1, the methylhydrogen polysiloxane component of the composition provided 0.39 mole of silicon-bonded hydrogen atoms, the first alpha, omega dihydroxy polydimethylsiloxane provided about 0.047 mole silicon-bonded hydroxyl groups, the second alpha, omega dihydroxy polydimethylsiloxane provided about 0.010 mole silicon-bonded hydroxyl groups, the third alpha, omega dihydroxy polydimethylsiloxane provided about 0.0012 mole silicon-bonded hydroxyl groups the isopropyl alcohol provided 0.049 mole carbon-bonded hydroxyl groups and the surfactant provided 0.009 mole silicon-bonded hydroxyl groups. The ratio of silicon-bonded hydrogen atoms to silicon-bonded hydroxyl groups plus carbon-bonded hydroxyl groups in the mixed composition was thus 3.6:1.

A first illustrative composition comprised three component Parts A, B and C. The Part A comprised 26.4 parts of the first alpha, omega hydroxy polysiloxane, 58.8 parts of the second alpha, omega hydroxy polysiloxane, 2.8 parts isopropyl alcohol, 11.4 parts of the polysiloxane (f) and 0.6 part of the platinum catalyst just above described. The Part B comprised 26 parts of the first alpha, omega hydroxy polysiloxane, 24 parts of the second alpha, omega hydroxy polysiloxane, 24 parts of the third alpha, omega hydroxy polysiloxane and 26 parts of the trimethylsiloxy endblocked methyl hydrogen polysiloxane and the Part C comprised 88 parts of tetraisopropyl titanate in 12 parts of a vinyl polydimethylsiloxane having a viscosity of 2000 mm²/s. The Parts A, B and C had viscosities of 800, 840, 100 mm²/s respectively. The first illustrative composition was prepared by mixing the Parts A, B and C in a ratio of 1:1:0.05.

The compositions were mixed by hand with a spatula and immediately poured into and allowed to flow down a V-shaped trough set at an angle of sixty degrees to the horizontal. The performance of each mixture was measured by determining the distance which a fixed amount of the freshly mixed mixture would flow down the inclined trough. The results of the performance testing of the mixtures is set forth in Table I.

TABLE I

| First Parameter | First Illustrative | Comparative |
| --- | --- | --- |
| Flow in centimeters | 10 | >60 |
| Density in kg/m³ | 145 | 100 |
| Cure time in seconds | 60 | 33 |

TABLE I-continued

| First Parameter | First Illustrative | Comparative |
|---|---|---|
| Ratio of $\frac{[SiOH]}{[Ti(OR)_4]}$ | 4 | — |

Table I shows that the inclusion of the liquid organic titanate provided a six fold retardation of the distance travelled by the mixture down the inclined trough.

EXAMPLE II

Hydroxy Vinyl System

A second comparative composition comprised two Parts A and B for admixture in a ratio of 1:1. The part A comprised two vinyldimethylsilyl endblocked polydimethylsiloxanes namely 54 parts of a first one having a viscosity of about 350 mm²/s at 25° C. and 37 parts of a second one having a viscosity of about 2000 mm²/s at 25° C., 4 parts isopropyl alcohol and 0.7 part of the catalyst comprising chloroplatinic acid complexed with vinyl disiloxane. The Part A had a viscosity of 642 mm²/s. The part B comprised 24 parts of the first alpha, omega hydroxy polydimethylsiloxane, 20 parts of the second alpha, omega hydroxy polydimethylsiloxane, 21 parts of the third alpha, omega hydroxy polydimethylsiloxane, 9 parts of the polysiloxane (f) and 26 parts of the trimethylsiloxy endblocked methyl hydrogen polysiloxane used in Example I. The Part B had a viscosity of 650 mm²/s.

When the composition was formed by mixing the Parts A and B in a ratio of 0.96:1, the methylhydrogen polysiloxane component of the composition provided 0.39 mole of silicon-bonded hydrogen atoms, the first alpha, omega dihydroxy polydimethylsiloxane provided about 0.022 mole silicon-bonded hydroxyl groups, the second dihydroxy polydimethylsiloxanes provided about 0.0024 mole silicon-bonded hydroxy groups, the third alpha, omega dihydroxy polydimethylsiloxane provided about 0.0011 mole silicon-bonded hydroxyl groups, the isopropyl alcohol provided 0.066 mole carbon-bonded hydroxyl groups and the surfactant provided 0.0135 mole silicon-bonded hydroxyl groups. The ratio of silicon-bonded hydrogen atoms to silicon-bonded hydroxyl groups plus carbon-bonded hydroxyl groups in the mixed composition was thus 3.7:1.

A second illustrative composition comprised two component Parts A and B. The Part A comprised the same ingredients, in the same proportions as were used for the Part A of the second comparative composition together with 3.7 parts tetraisopropyl titanate. The Part B comprised the same ingredients, in the same proportions as Part B of the second comparative composition. The Parts A and B had viscosities of 684 and 650 mm²/s at 25° C. respectively. The second illustrative composition was prepared by mixing the Parts A and B in a ratio of 1:1.

A third illustrative composition comprised three component Parts A, B and C. The Parts A and B comprised the same ingredients in the same proportions as the Parts A and B of the second comparative composition. The Part C comprised 37 parts of tetraisopropyl titanate in 63 parts of the first dimethylvinyl endblocked polydimethylsiloxane. The Parts A, B and C had viscosities of 684, 650, 250 mm²/s at 25° C. respectively. The third illustrative composition was prepared by mixing the Parts A, B and C in a ratio of 0.96:1:0.1.

The compositions were mixed by hand with a spatula and immediately poured into and allowed to flow down a V-shaped trough set at an angle of sixty degrees to the horizontal. The performance of each mixture was measured by determining the distance which a fixed amount of the freshly mixed mixture would flow down the inclined trough. The results of the performance testing of the mixtures is set forth in Table II.

TABLE II

| Parameter | Second Comparative | Second Illustrative | Third Illustrative |
|---|---|---|---|
| Flow in centimeters | >60 | 20 | 30 |
| Density in kg/m³ | 224 | 98 | 100 |
| Cure time in seconds | 120 | 78 | 78 |
| Ratio of $\frac{[SiOH]}{[Ti(OR)_4]}$ | — | 1.9 | 1.9 |

Table II shows that the inclusion of the liquid organic titanate provided a 2 or 3 fold reduction of the distance travelled by the mixture down the inclined trough.

EXAMPLE IV

A fourth illustrative composition was prepared and the flow of the foam examined both when mixed by hand and when mixed and dispensed by a jet impingement mixing unit.

The fourth illustrative composition comprised two Parts A and B for admixture in a ratio of 1:1. The Part A comprised 40 parts of the first vinyldimethylsilyl endblocked polydimethylsiloxanes and 44.6 parts of the second vinyldimethylsilyl endblocked polydimethylsiloxane referred to above, 3.3 parts isopropyl alcohol, 0.7 part of the catalyst comprising chloroplatinic acid complexed with vinyl disiloxane, 9 parts of the polysiloxane (f) and 2.7 parts tetraisopropyl titanate. The Part A had a viscosity of 660 mm²/s. The Part B comprised 30 parts of the first alpha, omega hydroxy polydimethylsiloxane, 24 parts of the second alpha, omega hydroxy polydimethylsiloxane, 24 parts of the third alpha, omega hydroxy polydimethylsiloxane and 26 parts of the trimethylsiloxy endblocked methyl hydrogen polysiloxane used in Example I. The Part B had a viscosity of 800 mm²/s.

When the composition was formed by mixing the Parts A and B in a ratio of 1:1 the methylhydrogen polysiloxane component of the composition provided 0.42 mole silicon-bonded hydrogen atoms, the first alpha, omega dihydroxy polydimethylsiloxane provided about 0.022 mole silicon-bonded hydroxyl groups, the second dihydroxy polydimethylsiloxane provided about 0.0028 mole silicon-bonded hydroxy groups, the third dihydroxy polydimethylsiloxane provided 0.0011 mole silicon-bonded OH groups, the isopropyl alcohol provided 0.055 mole carbon-bonded hydroxyl groups and the surfactant provided 0.0135 mole silicon-bonded hydroxyl groups. The ratio of silicon-bonded hydrogen atoms to silicon-bonded hydroxyl groups plus carbon-bonded hydroxyl groups in the mixed composition was thus 4.1:1.

The compositions were mixed in a ratio of 1:1 in two ways. A first mixture was made by hand with a spatula and immediately poured into and allowed to flow down a V-shaped trough set at an angle of sixty degrees. A second mixture was made in an AFROS CANNON S20 jet impingement mixing unit which was arranged to dispense the mixed composition against a surface set at an angle of 60°. The performance of each mixture was measured by determining the length which a fixed amount of the freshly mixed mixture would flow down the inclined trough surface. The results of the performance testing of the mixture is set forth in Table III.

TABLE III

| Parameter | Fourth Illustrative | |
|---|---|---|
| Mixing method | Hand | Machine |
| Flow in centimeters | 16 | 30 |
| Density (Kg/cm³) | 110 | 143 |
| Cure time (seconds) | 60 | 45 |
| Ratio of $\frac{SiOH}{[Ti(OR)_4]}$ | 2.8:1 | 2.8:1 |

As can be seen from Table III the presence of the liquid organic titanium compound is effective to reduce flow of the curing composition when mixed by machine as well as by hand. As compared with the results shown for the first and second comparative compositions shown in Tables I and II the flow demonstrated by the fourth illustrative composition is reduced by a factor of more than 3 for the hand mixed material and by a factor of 2 for the machine mixed material and the cure time is 60 seconds or less.

That which is claimed is:

1. A foam forming composition comprising (a) one or more polysiloxanes having not less than three alkylhydrogen siloxane units per molecule, (b) one or more polysiloxanes having not less than two silicon-bonded hydroxyl group per molecule, (c) at least one liquid organic titanium compound and (d) a catalyst.

2. A composition according to claim 1 in which the liquid organic titanium compound is selected from the group consisting of tetra-n-propyltitanate, tetraisopropyltitanate, tetrabutyltitanate, tetrakisethylhexyltitanate and ethylacetoacetatetitan-chelate.

3. A composition according to claim 1 also comprising (e) a polysiloxane having unsaturated hydrocarbon groups for reaction with the polysiloxane having alkylhydrogen siloxane units.

4. A composition according to claim 1 also comprising (f) a polyorganosiloxane comprising

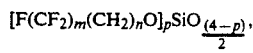

$R_3SiO_{\frac{1}{2}}$ and $SiO_{4/2}$ units and silicon-bonded hydroxyl groups wherein each R represents a monovalent hydrocarbon group containing from 1 to 20 carbon atoms, m is an integer having an average value from 1 to 20, n has the value 1 or 2, p has the value 1, 2 or 3.

5. A foam forming composition according to claim 1 wherein the catalyst comprises a platinum complex.

6. A composition according to claim 3 in the form of two storage stable component Parts of similar viscosities one comprising the polysiloxanes (a) and (b) and the other comprising the liquid organic titanium compound (c), the catalyst (d) and the polysiloxane (e).

7. A composition comprising a mixture of a liquid organic titanate and a silicone based foamable composition formed by mixing ingredients comprising (a) one or more polysiloxanes having not less than three alkylhydrogensiloxane units per molecule, (b) one or more polysiloxanes having not less than two silicon- bonded hydroxyl groups per molecule, (c) one or more compounds having carbon-bonded hydroxyl groups present in a proportion to provide from 0 to 2% by weight of the composition, (f) a polyorganosiloxane comprising

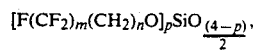

$R_3SiO_{\frac{1}{2}}$ and $SiO_{4/2}$ units and silicon-bonded hydroxyl groups wherein each R represents a monovalent hydrocarbon group containing from 1 to 20 carbon atoms, m is an integer having an average value from 1 to 20, n has the value 1 or 2, p has the value 1, 2 or 3 and a noble metal catalyst for promoting reaction between the ingredients, the ingredients being present in the mixed composition in proportions such that the ratio of silicon-bonded hydrogen atoms of said one or more polysiloxanes having not less than three alkylhydrogensiloxane units per molecule to silicon-bonded hydroxyl groups and carbon-bonded hydroxyl groups of the other ingredients of the composition lies in the range 1:1 to 6:1.

8. In a method for preparing a cured organosiloxane foam by blending to homogeneity the ingredients of a curable composition comprising
    (a) one or more polysiloxanes containing not less than three alkylhydrogen siloxane units per molecule,
    (b) one or more polysiloxanes having not less than two silanol groups per molecule and
    (c) a catalyst for the reaction between silicon-bonded hydrogen atoms and silanol groups
the improvement comprising including as an ingredient of said curable composition a liquid organotitanium compound to reduce the flow of said composition prior to curing.

9. A method according to claim 8 in which the liquid organic titanium compound is selected from the group consisting of tetra-n-propyltitanate, tetra-isopropyltitanate, tetrabutyltitanate, tetraethylhexyltitanate and ethylacetoacetate-titanchelate.

10. A method according to claim 8 wherein the silicone based foamable composition comprises (e) a polysiloxane having unsaturated hydrocarbon groups for reaction with the polysiloxane having alkylhydrogensiloxane units.

11. A method according to claim 8 wherein the silicone based foamable composition comprises a polyorganosiloxane (f) comprising

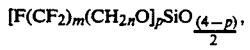

$R_3SiO_{\frac{1}{2}}$ and $SiO\ 4/2$ units and silicon-bonded hydroxyl groups wherein each R represents a monovalent hydrocarbon group containing from 1 to 20 carbon atoms, m is an integer having an average value from 1 to 20, n has the value 1 or 2 and p has the value 1, 2 or 3.

12. A method according to claim 8 wherein the catalyst comprises a platinum complex.

13. A method according to claim 8 wherein the polysiloxanes and catalyst are in the form of two storage stable component Parts of similar viscosities one comprising the polysiloxanes (a) and (b) and the other comprising the liquid organic titanium compound, the catalyst (d) and the polysiloxane(e).

* * * * *